(12) United States Patent
Weschenfelder

(10) Patent No.: US 6,178,884 B1
(45) Date of Patent: Jan. 30, 2001

(54) DRIVE FOR A ROTATING COMPONENT OF A ROTARY PRINTING PRESS

(75) Inventor: Kurt Johannes Weschenfelder, Zell (DE)

(73) Assignee: Koenig & Bauer-Aktiengesellschaft, Wurzburg (DE)

( * ) Notice: Under 35 U.S.C. 154(b), the term of this patent shall be extended for 0 days.

(21) Appl. No.: 09/423,311

(22) PCT Filed: May 13, 1998

(86) PCT No.: PCT/DE98/01315

§ 371 Date: Nov. 12, 1999

§ 102(e) Date: Nov. 12, 1999

(87) PCT Pub. No.: WO98/51497

PCT Pub. Date: Nov. 19, 1998

(30) Foreign Application Priority Data

May 14, 1997 (DE) ................................ 197 20 240

(51) Int. Cl.$^7$ ...................................... B41F 13/24
(52) U.S. Cl. .............................. 101/247; 101/216
(58) Field of Search ..................... 101/144, 145, 101/182, 184, 185, 191, 192, 209, 216, 217, 218, 247, 248

(56) References Cited

U.S. PATENT DOCUMENTS

| 3,584,474 | 6/1971 | Church . | |
|---|---|---|---|
| 4,831,858 | 5/1989 | Yoshizawa et al. . | |
| 5,656,909 | * 8/1997 | Gotz et al. | 318/625 |
| 5,813,336 | * 9/1998 | Guaraldi et al. | 101/218 |
| 5,953,991 | * 9/1999 | Geissenberger et al. | 101/218 |

FOREIGN PATENT DOCUMENTS

| 4322744 A1 | 1/1995 | (DE) . |
| 9422044 U1 | 9/1997 | (DE) . |
| 0669208 | 8/1995 | (EP) . |
| 1160538 | 8/1969 | (GB) . |

* cited by examiner

Primary Examiner—Ren Yan
(74) Attorney, Agent, or Firm—Jones, Tullar & Cooper PC

(57) ABSTRACT

A cylinder of a rotary printing press is driven by a hollow shaft electric motor. The cylinder is supported in eccentric bushings and can be re-positioned. A coupling assembly, that includes two couplers and a connector shaft, is used to connect the shiftable cylinder to the fixed motor.

8 Claims, 1 Drawing Sheet

DRIVE FOR A ROTATING COMPONENT OF A ROTARY PRINTING PRESS

FIELD OF THE INVENTION

The present invention relates to the drive of a cylinder or a roller of a rotary printing press A hollow shaft motor is coupled to the cylinder or roller by couplings that compensate for angular deviations. The couplings are connected by a connector that is situated in the hollow shaft of the hollow shaft motor.

DESCRIPTION OF THE PRIOR ART

DE 94 22 044 U1 and DE 43 22 744 A1 respectively describe a directly driven cylinder of a rotary printing press. This cylinder is movably seated in eccentric bushings and is driven by an also movable electric motor.

U.S. Pat. No. 4,831,858 A discloses a drive for a vertically operating mill. Here, an end, which faces away form the mill, of a hollow shaft motor is connected by means of a uneversal joint with the mill. The mill itself is arranged fixed in place. The object of this patent is the reduction of the structural height.

GB 1,160,538, shows a drive for a cylinder, which is intended to be placed obliquely. The journal of the cylinder is seated by means of a rolling bearing in an eccentric bushing. The gear wheel is rotatably arranged on the eccentric bushing. The drive gear wheel and the journal are connected by means of a double-jointed coupling. It is the object of this arangement to prevent interference in the meshing of teeth.

SUMMARY OF THE INVENTION

The invention present is based on the object of creating a drive for a cylinder or a roller of a rotary printing press.

In accordance with the invention, this object is attained by the utilization of a hollow shaft motor to drive the cylinder or the roller. The motor is fixed in place while the axis of rotation of the cylinder or roller is shiftable. The motor rotor and the cylinder are both provided with couplings which compensate for angular deviation. These couplings can be joined by a connector arranged in the hollow shaft of the motor.

The advantages to be obtained by means of the invention consist in particular in that in connection with rotating components, whose rotating shaft is movable, or respectively whose position can be changed, a change in the tilt angle of a connector between the components and the drive motor is minimized. Stresses on compensation couplings are reduced in this way.

BRIEF DESCRIPTION OF THE DRAWINGS

A preferred embodiment of the present invention is represented in the drawings and will be explained in greater detail in what follows.

Shown are in.

DESCRIPTION OF THE PREFERRED EMBODIMENT

Figure 1:
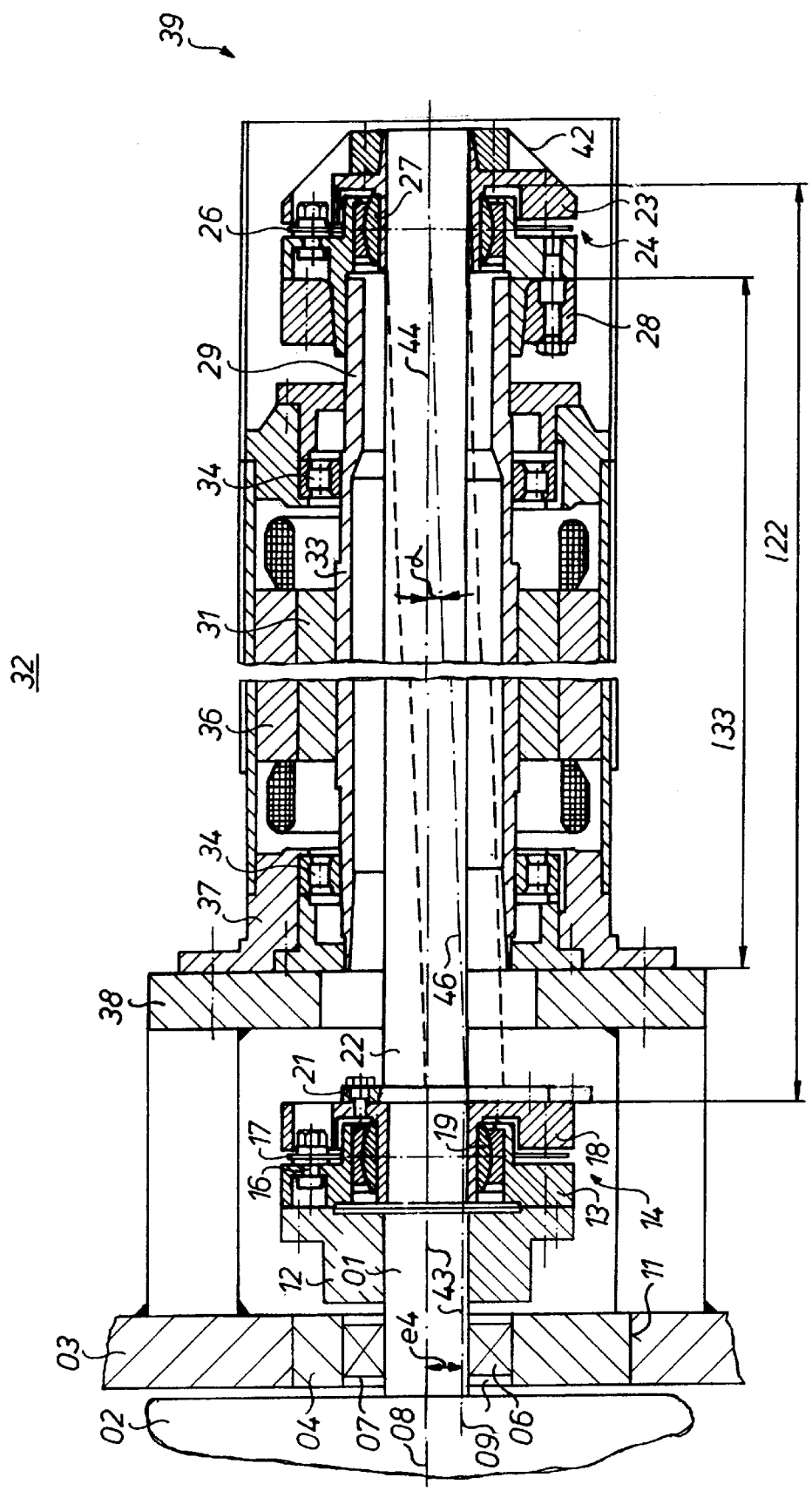
FIG. 1, a schematic representation of a drive of a rotating component in accordance with the present invention.

A journal 01 of a rotating component 02, for example a roller of an inking, or of a dampening unit, or of a cylinder 02 of an inking system, or of a folding apparatus, of a rotary printing press is movably seated in a lateral frame 03 by means of an eccentric bushing 04. Here, a journal 01 of the cylinder 02 is seated by means of a bearing 06 in a bore 07 of the eccentric bushing 04. A longitudinal axis 08 of this bore 07 of the eccentric bushing 04 is offset by an eccentricity e4 with respect to a longitudinal axis 09 of an exterior surface 11 of the eccentric bushing 04. This eccentric bushing 04 is arranged in the lateral frame 03 to be pivotable by means of a drive, not specifically represented.

A first coupling half 13 of a first coupling 14, for example a spring washer coupling, is fastened at an end of the journal 01 which is remote from the cylinder on a cylinder journal flange 12, which is fixed in place on the journal. A torsion-proof transmission element 17, for example a washer made of spring steel, is arranged on this first coupling half 13 by means of a threaded bolt 16. This transmission element is also connected, in a torsion-proof manner, with a second coupling half 18 by means of threaded bolts.

An outer ring of a rolling bearing, for example of an adjustment bearing 19, with this outer ring having a concave interior surface, is arranged in a bore of the first coupling half 13. This adjustment bearing 19 is provided for assuring an exact radial alignment of the two coupling halves in respect to each other. An inner ring of the adjustment bearing 19, with this ring having a convex exterior surface, is fastened on a sleeve of the second coupling half 18. A connector flange 21 of a connector shaft 22, which connector shaft 22 may be, for example a torsion-proof shaft 22, is screwed to a front face of the second coupling half 18 which is remote from the cylinder. A second end of the connector shaft 22 which is remote from the cylinder 02 is connected, for example by means of a clamping element, with a first coupling half 23 of a second coupling 24. In cooperation with the first coupling 14, the second coupling 24 is constructed to form a compensation coupling 14, 24 for compensating for angular displacement. In the second coupling 24, the first coupling half 23 is connected by means of a torque-proof transmission element 26 and an adjustment bearing 27 with a second coupling half 28.

The second coupling half 28 of the second coupling 24 is connected with a rotor end 29, which is remote from the cylinder, of a rotor 31 of a motor 32, for example a hollow shaft position- and/or rpm-controlled electric motor 32. A transfer of a torque from the motor 32 to the cylinder journal 01 preferably takes place exclusively from the rotor end 29, which is remote from the cylinder 02, of the rotor 31. An end of the rotor 31 which is close to the cylinder has no torque-transmitting connection with the cylinder journal 01.

This rotor 31 of the hollow shaft motor 32 has a hollow shaft 33. A length "133" of this hollow shaft 33 is less than a length "122" of the connector 22.

The rotor 31 is seated rotatably in respect to a stator 36 of the hollow shaft motor 32 by means of bearings 34, for example rolling bearings.

The stator 36 is screwed, by means of its stator flange 37, on a support 38 that is fixed in place on the lateral frame. The motor 32 is also fastened, fixed in place, on the lateral frame 03. The location of this motor 32 can be finely adjustable, but only during mounting.

In a first position, an axis of rotation 43 of the cylinder 02 and an axis of rotation 44 of the rotor 31, as well as the axis of rotation 46 of the connector shaft 22 are parallel in relation to each other and are aligned. The cylinder 02 is brought into a second position by pivoting the eccentric bushing 04. Because of this, the position of the axis of rotation 43 of the cylinder 02 changes. This axis of rotation 43 can now be, for example, offset parallel in respect to the axis of rotation 44 of the motor 32. This is the case when both eccentric bushings 04 of the journals 01 of the cylinder 02 are equally pivoted. This cylinder axis of rotation 43 can also be placed obliquely at an angle in respect to the axis of rotation 44 of the motor 32 if for example, only one eccentric bushing 04 was pivoted.

In the preferred embodiment, the axis of rotation 43 of the cylinder 02 is offset parallel with the axis of rotation 44 of the motor 32. Because of this, the end of the connector shaft 22 which is close to the cylinder 02 is displaced, while the end which is remote from the cylinder 02 and which is connected with the rotor 31 remains in place. The axis of rotation 46 of the connector shaft 22 is now arranged inclined at an angle α in relation to the axis of rotation 44 of the rotor 31.

The drive in accordance with the present invention is preferably used for directly driven cylinders; i.e. cylinders, without interposed gears. These cylinders can be individually driven or, for example, can also drive further cylinders, for example via gear wheels.

While a preferred embodiment of a drive for a rotary component of rotary printing press in accordance with the present invention has been set forth fully and completely hereinabove, it will be apparent to one of skill in the art that a number of changes in, for example, the specific type of cylinder being driven, the type of rotary printing press, and the like could be made without departing from the true spirit and scope of the present invention which is accordingly to be limited only by the following claims.

What is claimed is:

1. A drive for a cylinder of a rotary printing press comprising:

a cylinder having an axis of rotation;

means supporting said cylinder for displacement of said axis of rotation;

a hollow shaft electric motor including a hollow shaft, said hollow shaft electric motor having a rotor with a first end remote from said cylinder;

a first angular deviation compensating coupler secured to said first end of said rotor;

a second angular deviation compensating coupler secured to said cylinder; and a connector, said connector connecting said first and second couplers, said connector being positioned in said hollow shaft of said hollow shaft electric motor.

2. The drive of claim 1 further including a journal for said cylinder, said journal being positionally displaceable.

3. The drive of claim 2 further including an eccentric bushing, said journal for said cylinder being seated in said eccentric bushing.

4. The drive of claim 1 wherein said cylinder is arranged in an ink unit.

5. The drive of claim 1 wherein said cylinder is arranged in a dampening unit.

6. The drive of claim 1 wherein said cylinder is arranged in a printing system.

7. The drive of claim 1 wherein said cylinder is arranged in a folding apparatus.

8. The drive of claim 1 wherein a position of said motor can be finely adjusted.

* * * * *